Patented July 20, 1943

2,324,800

UNITED STATES PATENT OFFICE 2,324,800

PURIFICATION OF RIBOFLAVIN

Richard Pasternack, Brooklyn, and Ellis V. Brown, Cold Spring Harbor, N. Y., assignors to Charles Pfizer & Company, Brooklyn, N. Y., a corporation of New Jersey No Drawing. Application August 14, 1941,
Serial No. 406,928

3 Claims. (Cl. 260—211)

The object of this invention is the purification of crude riboflavin or vitamin $B_2$. As this vitamin was originally obtained from natural sources such as beef liver, egg yolk, milk, etc., in which it was present in very low concentration, most techniques for its purification have been extraction processes based upon the necessity for separating a small amount of vitamin from a much larger amount of miscellaneous organic matter. Generally the riboflavin, after extraction from the source materials with an organic or aqueous solvent, usually acidified, has been adsorbed upon a suitable inorganic material such as fuller's earth or lead sulfide, then eluted therefrom by means of various solvents, concentrated by evaporation, precipitated by a heavy metal, washed, redissolved and recrystallized.

Booher and Work, U. S. Patent No. 2,175,014, stress adsorbing from an aqueous extract containing approximately a one molar concentration of hydrochloric acid at a low temperature, then eluting with water at an elevated temperature to get a stronger solvent effect. Although mild acid was known to exert a stabilizing influence, it was not apparently considered safe to use high concentrations of strong acids, and in fact these inventors state: "There is danger, in strong acid solutions, of hydrolyzing the vitamin."

Ben Maizel, U. S. Patent No. 2,193,876, discloses that "a small amount of a suitable acid such as hydrochloric acid may be added to the extraction solvent—but it is to be understood that its use is purely optional." Maizel's original extraction was performed with an aqueous organic solvent.

Since riboflavin is not in general very soluble in liquids of high water content, such methods involved the handling of large volumes of solvent. The operation was tedious, the yield low and the product of varying quality.

Kuhn and Reinemund (Ber. 67: 1935, 1934) referred to 100% formic acid as an outstanding crystallization solvent for flavins, especially for 6,7,9-trimethylflavin, but our experiments have shown that crystallization of riboflavin from formic acid solution does not purify it sufficiently for practical purposes.

R. Kuhn and others (Ber. 66: 1036, 1933) refer to the stability of riboflavin against bromine, nitric and nitrous acids and hydrogen peroxide, but apparently made no use of this property for its purification and did not consider the acids as solvents.

Obviously, the purification of crude synthetic riboflavin is a very different problem from that of isolating the natural product. Although the impurities in the synthetic product constitute only a minor proportion of the whole mass, they are of a very different nature from the substances in which natural riboflavin occurs. Evidently they must consist for the most part of by-products of the condensation of substituted ribityl amines with substituted pyrimidines. As would be expected, they show solubilities and other properties in some degree resembling those of riboflavin. Their nature has been discussed by Kuhn and Weygand (Ber. 68: 1282-8, 1935) and by P. Karrer and others (Helv. Chim. Acta 18: 69-79, 1935). Experiment shows that they are in general of low solubility in water and alcohol, like the vitamin itself.

Our investigations have shown that in the absence of excess quantities of water, riboflavin is substantially soluble in the common mineral acids at ordinary temperature, and is stable in such solution. Mere recrystallization is of little value as a purification step, but we have found that when dissolved in strong acid the condensation by-products and other impurities are attacked by oxidizing agents which do not affect the riboflavin. Our process also includes isolating the riboflavin from the oxidized acid solution in a pure crystalline form.

Commercial concentrated mineral acids such as hydrochloric acid, sulfuric acid, orthophosphoric acid and nitric acid are suitable, and an actively oxidizing acid such as nitric acid may serve as both solvent and oxidizing agent. However, in general we prefer hydrochloric acid and chlorine, or a combination of hydrochloric acid with an oxidizing agent such as hydrogen peroxide, nitric acid or chloric acid, which by interaction with the hydrochloric acid will yield chlorine. In general, it is advantageous to dilute the commercial concentrated acid with not more than two volumes of water, and a moderate degree of heating after dilution tends to promote the desired oxidation processes. Apparently the impurities undergo only partial oxidation, but the practical result is that a minor proportion which originally were soluble in the strong acid now become insoluble, while the rest are converted to substances which will remain dissolved even when the solution is much diluted by pouring into several times its volume of water. The riboflavin, however, comes out of solution almost completely. Often the first precipitate consists chiefly of amorphous, jelly-like lumps, sometimes mixed with microcrystals, but usually in a mass which is extremely difficult to filter. By stirring at elevated temperatures the jelly-like material becomes crystalline and the fine crystals are enlarged. It is not possible to state temperatures and times definitely since each preparation acts individually. Useful temperatures range from 50° to 100° C., while the time required may be as little as five minutes or as long as several days. Progress of the crystallization is readily followed by examining samples under the microscope, and the digestion should be continued until a uniform, readily purgible crystal mass is obtained. In general, higher temperatures favor more rapid enlargement of the crystals. The magna is then cooled to reduce solubility of riboflavin to a minimum, and filtered.

*Example 1.*—100 g. crude synthetic riboflavin (of approximately 85% purity) were dissolved in 265 cc. of 24% HCl at room temperature. 50 cc. 30% hydrogen peroxide was added with stirring, and the mixture was allowed to stand until the muddy solution became clear bright yellow. A good deal of bubbling and foaming occurred. The insoluble material collected on the surface in the form of a scum. The solution was filtered and run into 5 liters water at 70° C. Upon contact with the water, the riboflavin precipitated in a mixture of fine crystals and amorphous jelly-like lumps, but on continued stirring at 70° the whole was converted to uniform, large needle crystals. The magma was cooled to room temperature, filtered and washed free of chlorides with cold water. The recovery was approximately 75 g., or 88.3%, of riboflavin of pharmaceutical quality.

*Example 2.*—The process was the same as the above, except that gaseous chlorine was used as the oxidizing agent. In this case there was little or no foaming, so that no scum was formed and the precipitated material remained dispersed throughout the solution. The end of the reaction was determined by the appearance of the desired clear, bright yellow color. The yield and purity of the product was of the same order as in Example 1.

*Example 3.*—100 g. riboflavin of 87% purity were dissolved in 260 cc. of 46% $HNO_3$. After standing at 50–60° C. with occasional agitation for 3 hours, the solution became a clear, bright yellow with only a small amount of insoluble matter suspended therein. This latter was removed by filtration, and the clear solution was run into 5 liters of water at 75° C. The first amorphous precipitate was somewhat slow in developing sharp needle crystals. The temperature was therefore raised to 90° C. and after about 4 hours stirring, examination under the microscope showed a satisfactory crystal structure. The whole was cooled to room temperature in the course of one hour during which time the crystals further increased in size. The yield was 74 g., or approximately 85%.

What we claim is:

1. Process of purifying crude riboflavin comprising dissolving the riboflavin in an aqueous acid solution prepared by diluting a member of the group consisting of commercial concentrated hydrochloric, sulfuric, nitric and phosphoric acids with not more than two volumes of water, oxidizing the impurities at a temperature below 100° C. by the action of a member selected from the group consisting of chlorine, hydrogen peroxide, nitric acid and chloric acid, to substances readily separable from the riboflavin, filtering out the insoluble products, running the solution into an excess of water to precipitate the riboflavin while the residual oxidation products remain in solution, and stirring at elevated temperature to develop large, readily purgible crystals of riboflavin.

2. In the process of purifying crude riboflavin, the step of subjecting its solution in a member of the group consisting of hydrochloric, sulfuric, nitric and phosphoric acids to the action of an oxidizing agent selected from the group consisting of chlorine, hydrogen peroxide, nitric acid and chloric acid at a temperature below 100° C., to convert the impurities to substances readily separable from the riboflavin.

3. In the process of purifying crude synthetic riboflavin, the step of dissolving the crude riboflavin in 2½ to 5 parts of commercial concentrated hydrochloric acid diluted with not more than two volumes of water, and subjecting the strongly acid solution to the action of an oxidizing agent selected from the group consisting of chlorine, hydrogen peroxide, nitric acid and chloric acid to convert the impurities in part to substances insoluble in the strong acid, while the rest are oxidized to forms which remain dissolved when the solution is substantially diluted with water to precipitate the riboflavin.

RICHARD PASTERNACK.
ELLIS V. BROWN.